(12) United States Patent
Foster et al.

(10) Patent No.: US 7,603,892 B2
(45) Date of Patent: Oct. 20, 2009

(54) CAM AND CRANK SENSOR WITH CURRENT LIMITING OPEN COLLECTOR OUTPUT FOR CONDUCTED EMISSIONS IMPROVEMENT

(75) Inventors: Steven D. Foster, Rockford, IL (US); Jason M. Chilcote, Frisco, TX (US); John A. Modica, Lena, IL (US)

(73) Assignee: Honeywell International Inc., Morristown, NJ (US)

( * ) Notice: Subject to any disclaimer, the term of this patent is extended or adjusted under 35 U.S.C. 154(b) by 489 days.

(21) Appl. No.: 11/446,470

(22) Filed: Jun. 2, 2006

(65) Prior Publication Data

US 2007/0277587 A1    Dec. 6, 2007

(51) Int. Cl.
*G01M 19/00* (2006.01)
(52) U.S. Cl. ............... 73/114.26; 324/207.25
(58) Field of Classification Search ........ None
See application file for complete search history.

(56) References Cited

U.S. PATENT DOCUMENTS

| | | | |
|---|---|---|---|
| 4,520,449 A | 5/1985 | Johnson et al. ........ 364/559 |
| 5,698,777 A | 12/1997 | Ramseyer et al. ........ 73/116 |
| 6,113,642 A * | 9/2000 | Petrofsky et al. ........ 623/24 |
| 6,158,719 A | 12/2000 | Carson et al. ........ 251/298 |
| 6,505,513 B1 * | 1/2003 | Linke et al. ........ 73/514.29 |
| 6,588,404 B1 | 7/2003 | Mathews ........ 123/479 |
| 6,691,024 B2 | 2/2004 | Kunz ........ 701/114 |
| 6,750,626 B2 | 6/2004 | Leonardi et al. ........ 318/602 |
| 6,759,843 B2 | 7/2004 | Furlong ........ 324/207.2 |
| 2003/0011332 A1 * | 1/2003 | Mays, II ........ 318/254 |
| 2004/0196026 A1 * | 10/2004 | Bolz ........ 324/207.12 |
| 2005/0068021 A1 | 3/2005 | Mager et al. |

* cited by examiner

*Primary Examiner*—Robert R Raevis
(74) *Attorney, Agent, or Firm*—Kermit D. Lopez; Luis M. Ortiz (57) ABSTRACT

A sensor apparatus and method include a sensor configured on an integrated circuit, which includes a current limiting open collector output stage configured in association with the integrated circuit. The current limiting open collector output stage reduces a fall time and a di/dt associated with an output signal of the sensor and a ringing produced thereof in order to improve EMC and conducted emissions required of the sensor.

13 Claims, 6 Drawing Sheets

CAM AND CRANK SENSOR WITH CURRENT LIMITING OPEN COLLECTOR OUTPUT FOR CONDUCTED EMISSIONS IMPROVEMENT

TECHNICAL FIELD

Embodiments are generally related to the field of angular and/or rotary position sensors. Embodiments are also related to sensors utilized in automotive applications. Embodiments are particularly related to camshaft and crankshaft sensors.

BACKGROUND

A variety of techniques are utilized for angular position sensing. Optical, resistive, electrical, and electrostatic and magnetic fields have all been utilized with sensing devices to measure position. There are many known devices that utilize optical, resistive, electrical, magnetic and other such energies for sensing. Examples of such sensing devices include resistive contacting sensors, inductively coupled ratio detectors, variable reluctance devices, capacitively coupled ratio detectors, optical detectors utilizing the Faraday Effect, photo-activated ratio detectors, radio wave directional comparators, and electrostatic ratio detectors. In addition, there are many other sensors/detectors that are not mentioned herein.

Each of these detection methods offers much value for one or more applications, but none meet all application requirements for all position sensing applications. The limitations may be due to cost, sensitivity to particular energies and fields, resistance to contamination and environment, stability, ruggedness, linearity, precision, or other similar factors. Transportation applications generally, and specifically automotive applications, are very demanding.

In mechanical and/or electromechanical systems, such as for example, automotive applications, motion can be initiated and controlled by rotating a member such as a shaft (e.g., camshaft, crankshaft, and so forth). The angular motion of the shaft is then translated into some other motion, such as linear displacement, rotation of a pump or fan, or the angular rotation of some other intermediate part at a different angular velocity or spatial orientation. Numerous mechanical means such as gears, cams, pulleys, and belts are commonly employed in translating the angular motion of an input shaft to drive an output device. Camshaft and crankshaft mechanisms, for example, are well known in the mechanical transportation arts. Thus, a need exists for sensors that can properly monitor motion and position in such mechanical systems. In engine cam and crank applications, for example, recently manufactured Cars require precision rotary sensors for high performance and fuel economy. Such engines often utilize electrical-mechanical solenoids to control the engine valves. The opening and closing of such valves are not controlled by a fixed cam but can be controlled by a microprocessor that receive inputs from precision rotary sensors regarding the crank and/or cam speed, torque, load, exhaust gas mixture, oxygen content, and so forth. In this manner, an engine can be achieved that is both efficient and high performing.

One example of a rotary position sensor that can be implemented as sensor 102 is disclosed in U.S. Pat. No. 6,747,448, entitled "Rotary Positions Sensor Methods and Systems," which issued to Dale Berndt on Jun. 8, 2004 and is incorporated herein by reference. U.S. Pat. No. 6,747,448, is assigned to Honeywell International Inc of Morristown, N.J. Another example of an angular or rotary position sensor is disclosed in U.S. Pat. No. 6,759,843, entitled "Sensing Methods and Systems for Hall and/or MR Sensors," which issued to Gregory R. Furlong on Jul. 6, 2004 and is incorporated herein by reference. U.S. Pat. No. 6,759,843 is also assigned to Honeywell International Inc. of Morristown, N.J.

Thus, a critical need exists for high performance camshaft and crankshaft position sensors. A major problem with current camshaft and crankshaft sensors that often such devices often do not pass required EMC and radiated emissions and/or conducted emissions testing. The purpose of emission testing is to verify that the product's spurious and unintended emissions do not exceed a level that will interfere with the operation of other electronic/electrical devices. Conducted EMI (i.e., conducted emissions) is usually measured in the shielded enclosure with the device configured such that all cables and peripherals are connected in a manner consistent with normal operation. Conducted EMI is measured as the RF noise voltage injected back into the mains supply by the device. Measurements are made on both the power and ground line in turn, over the frequency range 150 kHz to 30 MHz. The lower frequency extends to 9 kHz for some devices such as lighting. The noise voltage must be below the limit set by the standard.

In order to ensure that such sensors pass required EMC and radiated emissions requirements, it is believed that a new configuration and sensor design should be implemented. Such a design is disclosed herein.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention is to provide an improved rotary and angular position sensor.

It another aspect of the present invention to provide for an improved crankshaft and camshaft sensor.

It is an additional aspect of the present invention to provide for an improved crankshaft and camshaft sensor design that is capable of meeting and passing EMC and radiated emissions testing requirements.

The aforementioned aspects of the invention and other objectives and advantages can now be achieved as described herein. A sensor apparatus and method are disclosed. In generally, a sensor is configured on an integrated circuit, which includes a current limiting open collector output stage configured in association with the integrated circuit, wherein the current limiting open collector output stage reduces a fall time and a di/dt associated with an output signal of the sensor and a ringing produced thereof in order to improve EMC and conducted emissions testing required of the sensor.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
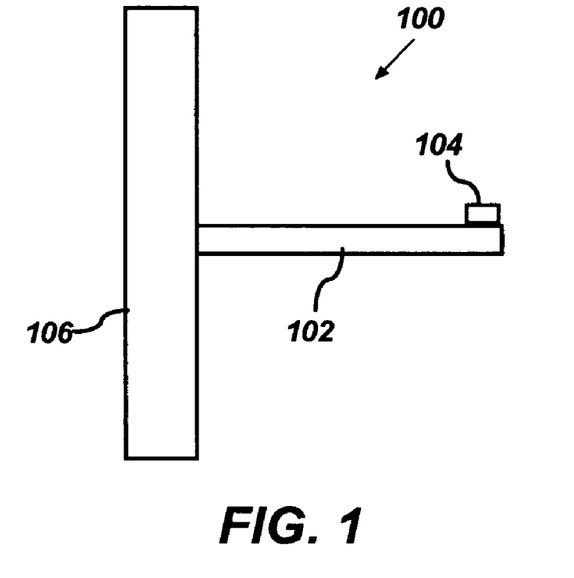
FIG. 1 illustrates a side view of a rotary/angular position sensor system, which can be adapted for use in accordance with a preferred embodiment.
Figure 2:
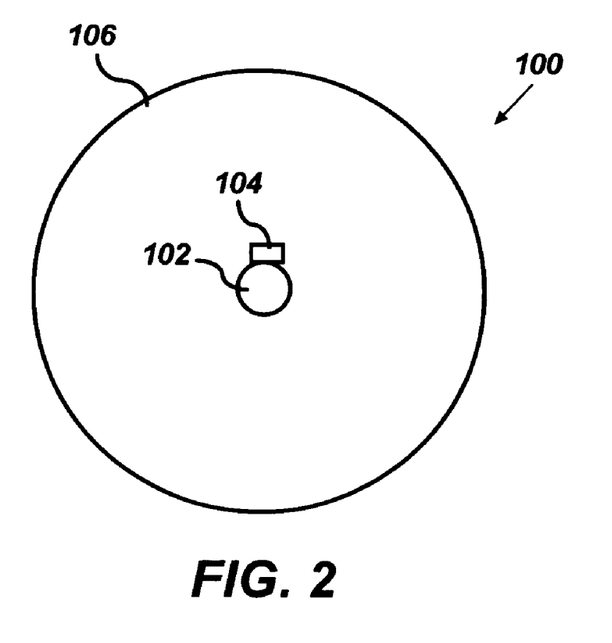
FIG. 2 illustrates a front view of the rotary/angular position sensor system depicted in FIG. 1 in accordance with a preferred embodiment.

FIG. 1 illustrates a side view of a rotary/angular position sensor system 100, which can be adapted for use in accordance with a preferred embodiment. FIG. 2 illustrates a front view of the rotary/angular position sensor system 100 depicted in FIG. 1 in accordance with a preferred embodiment. System 100 generally includes a shaft 102 connected to a rotatable plate 106. A rotary/angular position sensor 104 is located on or proximate to shaft 102 or rotatable plate 106 in order to detect the rotation and/or angular position of shaft 102 or rotatable plate 106. Sensor 104 may be provided as a camshaft sensor or a crankshaft sensor.

Figure 3:
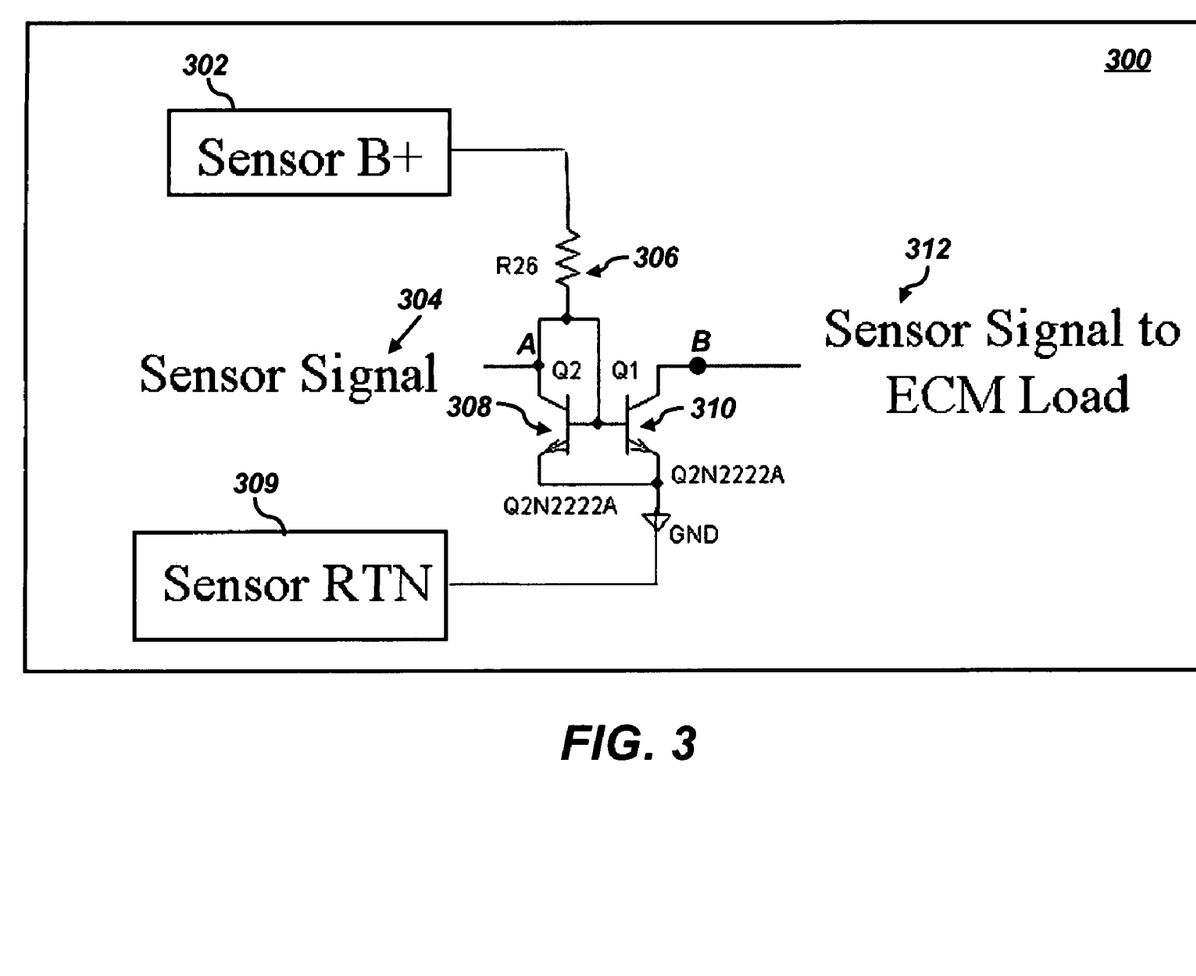
FIG. 3 illustrates a schematic diagram of an electrical circuit that can be implemented in accordance with a preferred embodiment.
Figure 4:
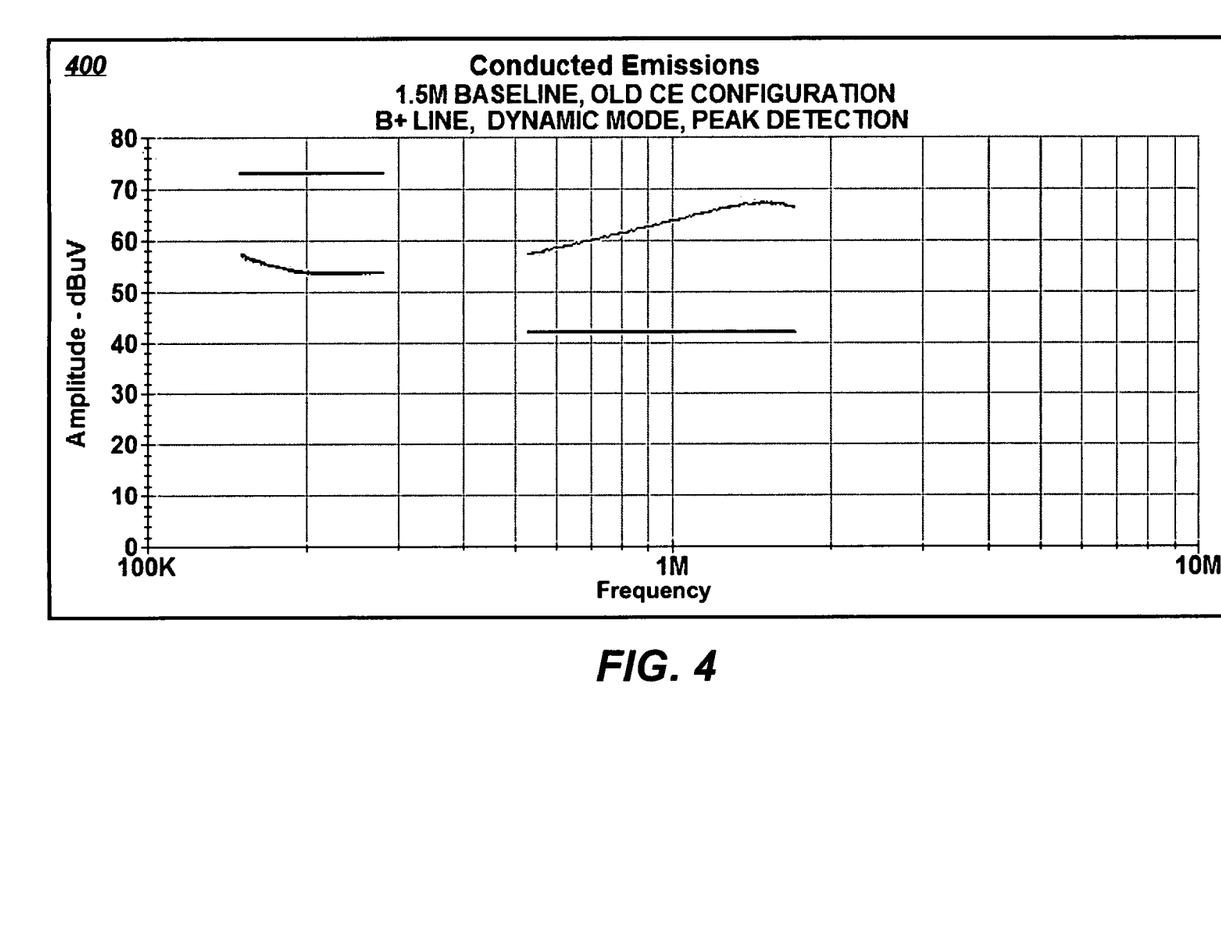
FIGS. 4-7 respectively illustrates graphs that demonstrate the baseline CE Results and the improvement of using the current limiting open collector output (Current Mirror) circuit disclosed in FIG. 3.
Figure 5:
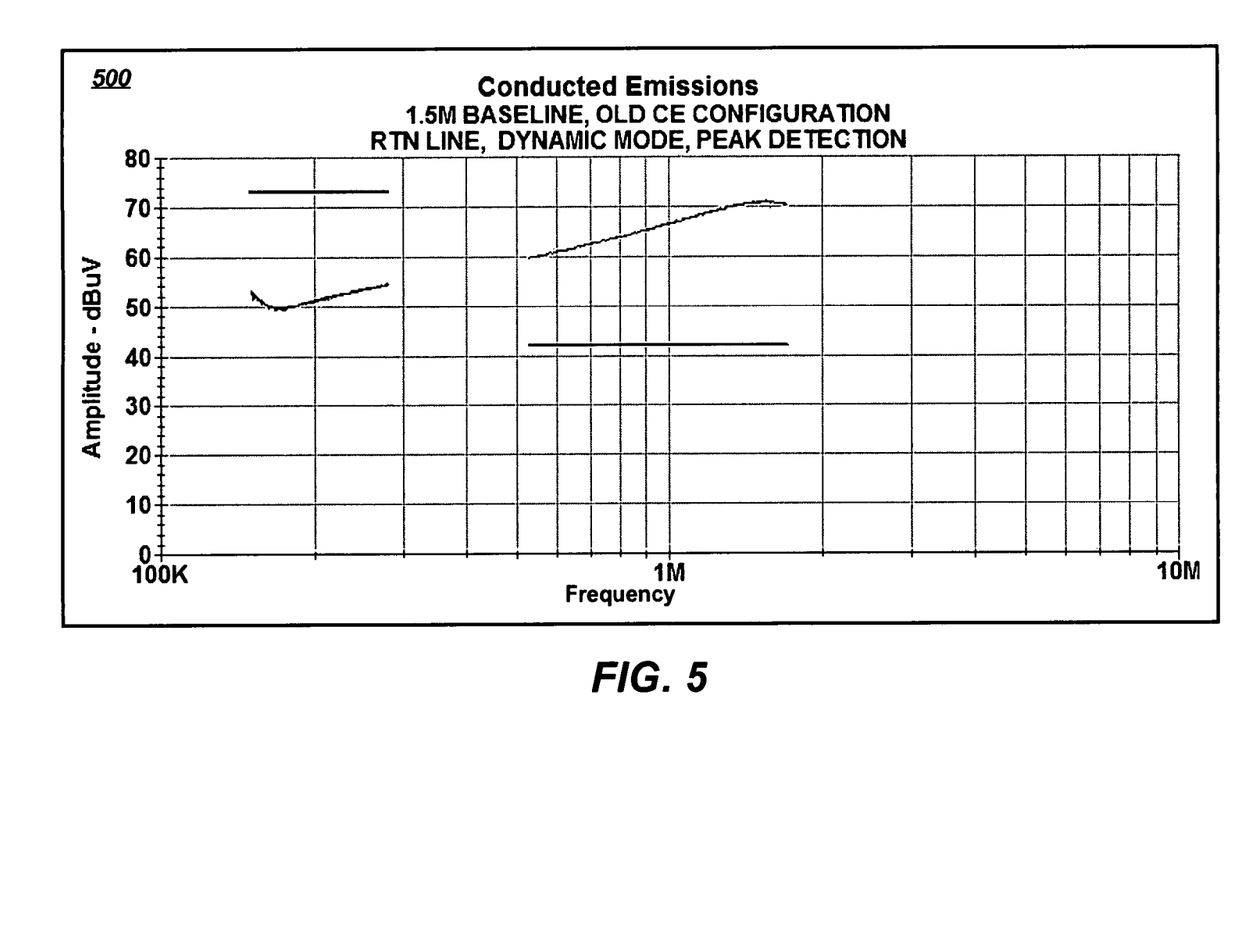
Figure 6:
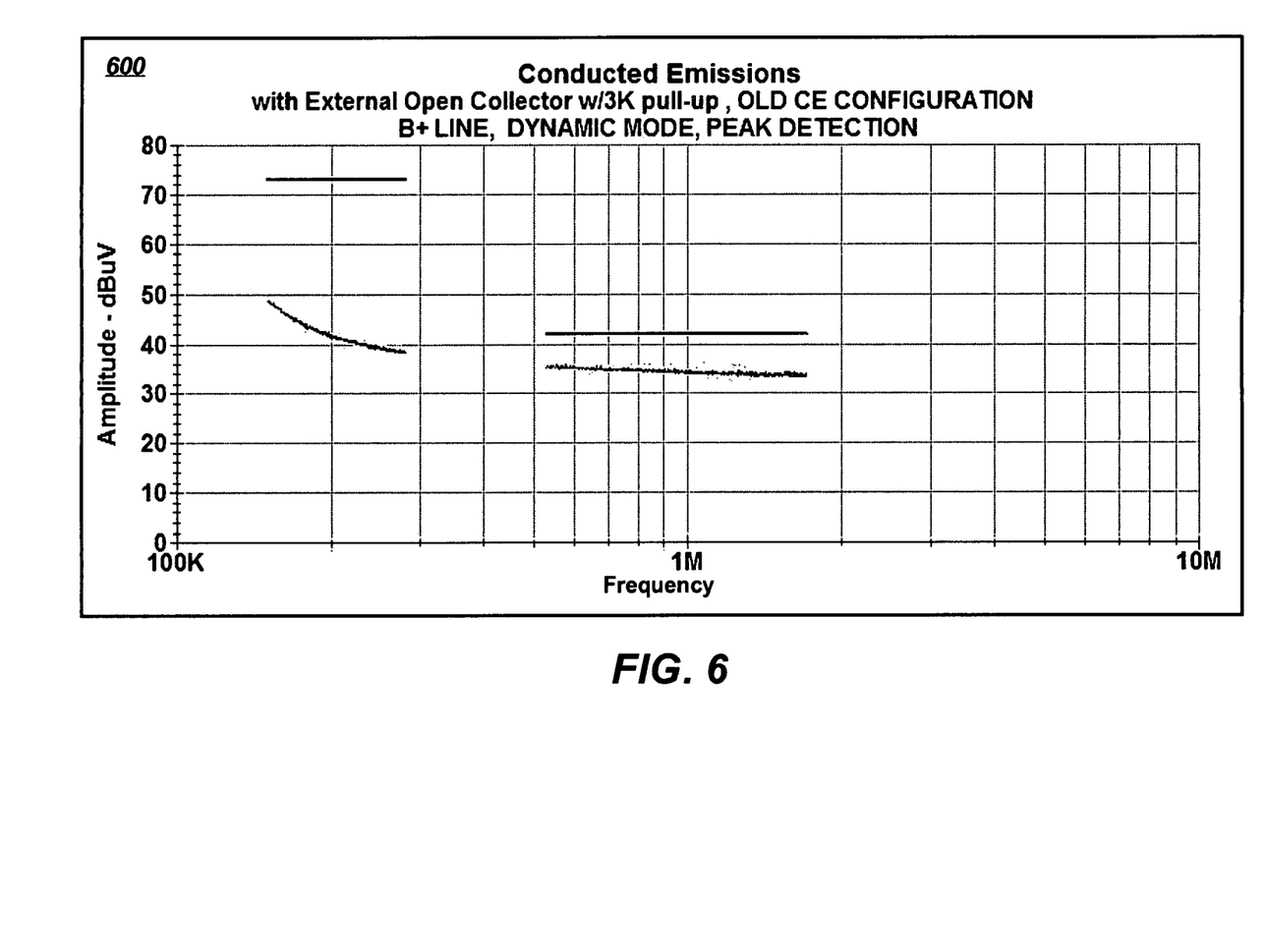
Figure 7:
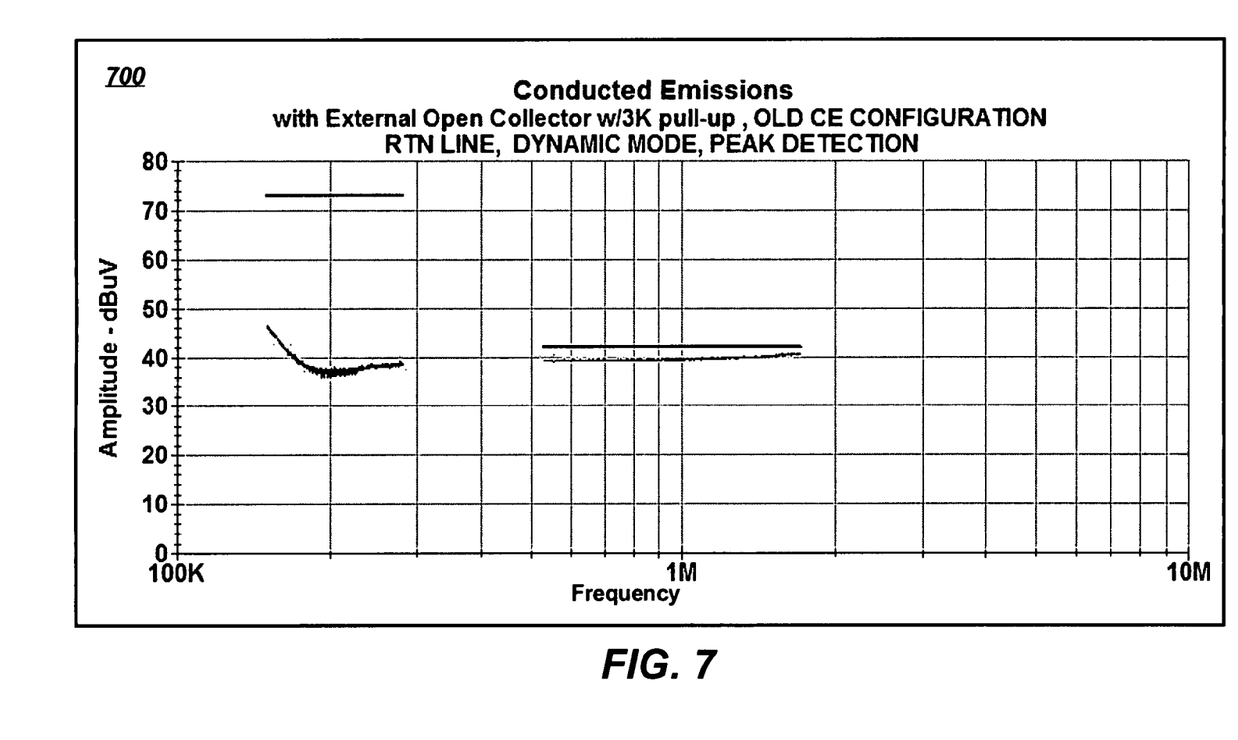

FIG. 3 illustrates a schematic diagram of an apparatus or electrical circuit 300 that can be implemented in accordance with a preferred embodiment. Circuit 300 can be utilized in association with the system 100 depicted in FIGS. 1-2. Circuit 300 generally functions as a current limiting open collector output stage and is configured on or in the context of an integrated circuit. A sensor signal 304 can be output from the rotary/angular position sensor 104 depicted in FIGS. 1-2 and provided to circuit 100 at node A. A resistor 306 is also generally connected to node A for fall time and a di/dt adjustment. Sensor supply voltage 302 (i.e., sensor B+) is connected to resistor 306, while a sensor ground 309 (i.e., sensor RTN) is connected to ground GND. Two transistors 308 and 310 are also provided as a part of circuit 300 and are both also connected to ground in addition to the resistor 306 at node A. A sensor signal can then be output from the circuit at node B and sent to an ECM load.

Circuit 300 can be implemented in the context of an Integrated Circuit (IC). The configuration of circuit 300 can be applied by integrating a current limiting open collector output stage on an IC or adding the circuit 300 to an IC and using appropriate RC (Resistor-Capacitor) filter components. Circuit 300 generally meets and exceed required EMC and radiated emissions testing capabilities by using a current limiting open collector output configuration that slows down the fall time of sensor 104 and reducing di/dt and ringing produced on the output signal (i.e., sensor signal 304 provided to circuit 300 and output from sensor system 100). In slowing down the fall time and reducing di/dt and ringing on the line, conducted emissions (CE) capabilities are improved to the point of meeting necessary EMC testing requirements.

FIGS. 4-7 respectively illustrates graphs 400, 500, 600, 700 that demonstrate the baseline CE Results and the improvement of using the current limiting open collector output (Current Mirror) circuit 300 disclosed in FIG. 3. Graphs 400, 500, 600, 700 generally plot data indicative of amplitude versus frequency and are provided herein for illustrative purposes only and are not considered limiting features of the embodiments.

It is contemplated that the use of the present invention can involve components having different characteristics. It is intended that the scope of the present invention be defined by the claims appended hereto, giving full cognizance to equivalents in all respects.

What is claimed is:

1. A sensor enhancement system, comprising:
a sensor configured on an integrated circuit;
a current limiting open collector output stage configured in association with said integrated circuit, wherein said current limiting open collector output stage reduces a fall time and a di/dt associated with an output signal of said sensor and a ringing produced thereof in order to improve EMC and conducted emissions required of said sensor, wherein said current limiting open collector output stage comprises:
a first transistor connected to a second transistor, wherein said first and second transistors are connected to a ground; and
a resistor connected to said first and second transistor, wherein said output signal provided by said sensor is fed to a node coupled to said first transistor and said resistor, such that said output signal is output from said second transistor.

2. The system of claim 1 further comprising:
a sensor supply voltage connected to said resistor; and
a sensor ground connected to said first and second transistors and said ground.

3. A sensor enhancement system, comprising:
a rotary/angular sensor configured on an integrated circuit;
a current limiting open collector output stage configured in association with said integrated circuit, wherein said current limiting open collector output stage reduces a fall time and a di/dt associated with an output signal of said rotary/angular sensor and a ringing produced thereof in order to improve EMC and conducted emissions required of said rotary/angular sensor, wherein said current limiting open collector stage comprises:
a first transistor connected to a second transistor, wherein said first and second transistors are connected to a ground:
a resistor connected to said first and second transistor, wherein said output signal provided by said sensor is fed to a node coupled to said first transistor and said resistor, such that said output signal is output from said second transistor.

4. The system of claim 3 wherein said rotary/angular sensor comprises a camshaft sensor.

5. The system of claim 3 wherein said rotary/angular sensor comprises a crankshaft sensor.

6. The system of claim 3 further comprising:
a sensor supply voltage connected to said resistor.

7. The system of claim 6 further comprising:
a sensor ground connected to said first and second transistors and said ground.

8. A method for enhancing a sensor, comprising:
configuring a sensor on an integrated circuit;
associating a current limiting open collector output stage with said integrated circuit, wherein said current limiting open collector output stage reduces a fall time and a di/dt associated with an output signal of said sensor and a ringing produced thereof in order to improve EMC and conducted emissions required of said sensor; and
configuring said current limiting open collector output stage to comprise:

a first transistor connected to a second transistor, wherein said first and second transistors are connected to a ground; and a resistor connected to said first and second transistor, wherein said output signal provided by said sensor is fed to a node coupled to said first transistor and said resistor, such that said output signal is output from said second transistor.

9. The method of claim 8 wherein said sensor comprises a rotary position sensor.

10. The method of claim 8 wherein said sensor comprises an angular position sensor.

11. The method of claim 8 wherein said sensor comprises a camshaft sensor.

12. The method of claim 8 wherein said sensor comprises a crankshaft sensor.

13. The method of claim 8 further comprising:

connecting a sensor supply voltage to said resistor; and connecting a sensor ground to said first and second transistors and said ground.

* * * * *

UNITED STATES PATENT AND TRADEMARK OFFICE
CERTIFICATE OF CORRECTION

PATENT NO. : 7,603,892 B2  Page 1 of 1
APPLICATION NO. : 11/446470
DATED : October 20, 2009
INVENTOR(S) : Foster et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 629 days.

Signed and Sealed this

Fifth Day of October, 2010

David J. Kappos
*Director of the United States Patent and Trademark Office*